Oct. 14, 1952 — H. M. SMURR — 2,613,868
WAVE MOTOR ASSEMBLY
Filed March 7, 1949 — 5 Sheets-Sheet 1
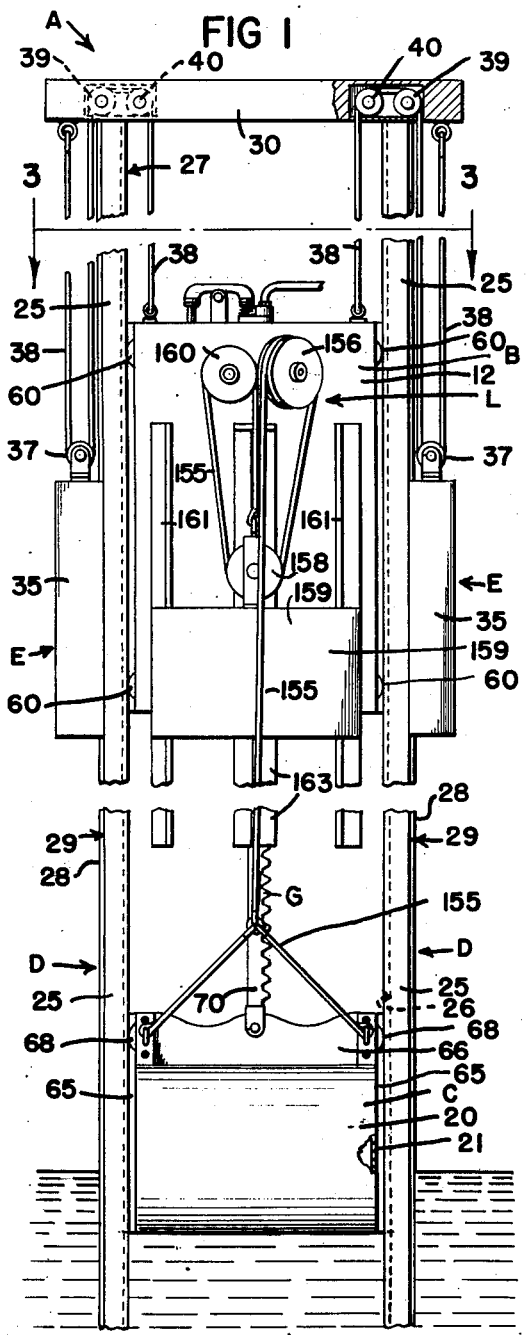
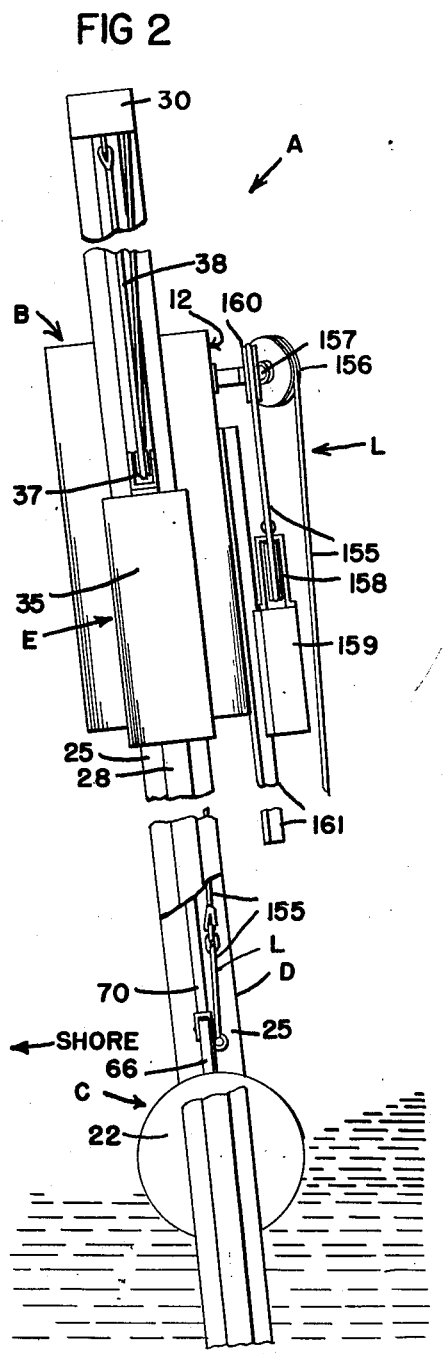
INVENTOR.
Harry M. Smurr

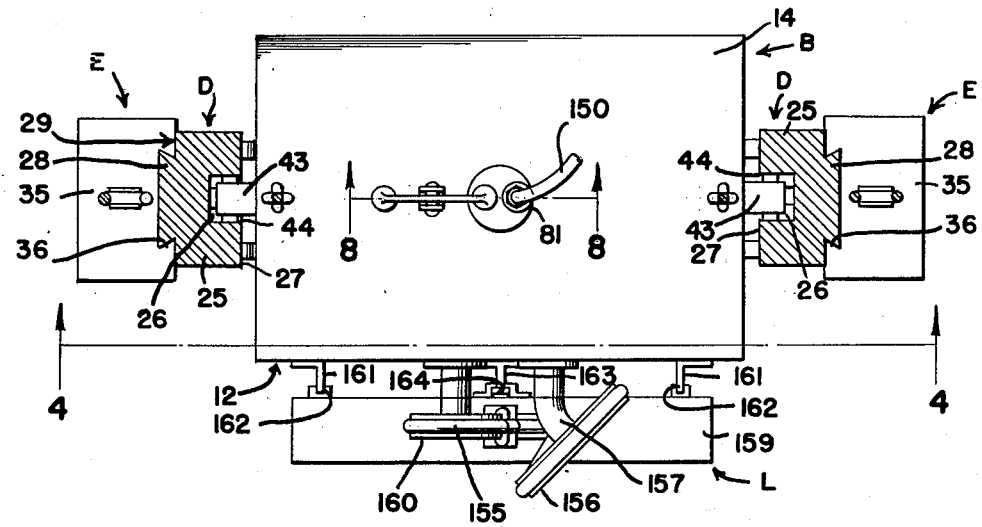
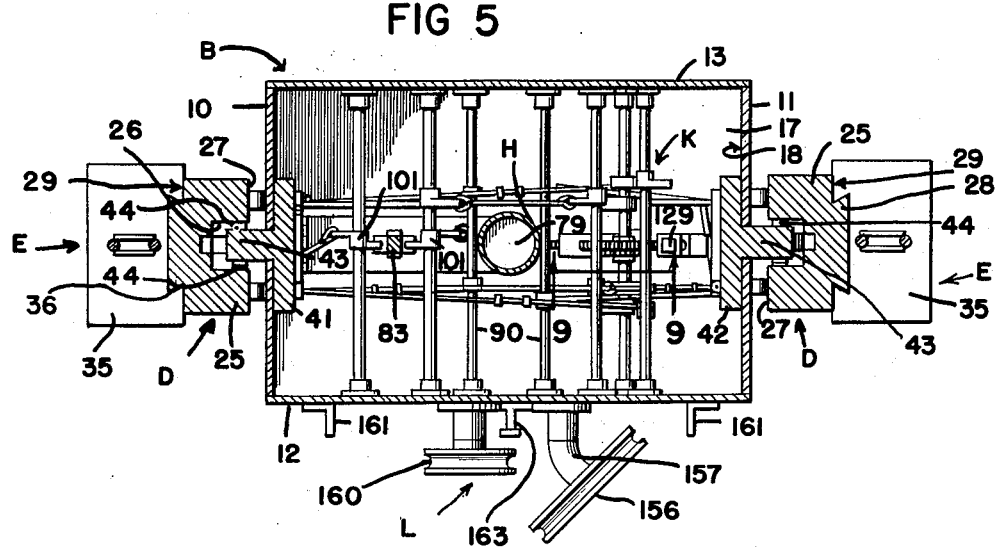

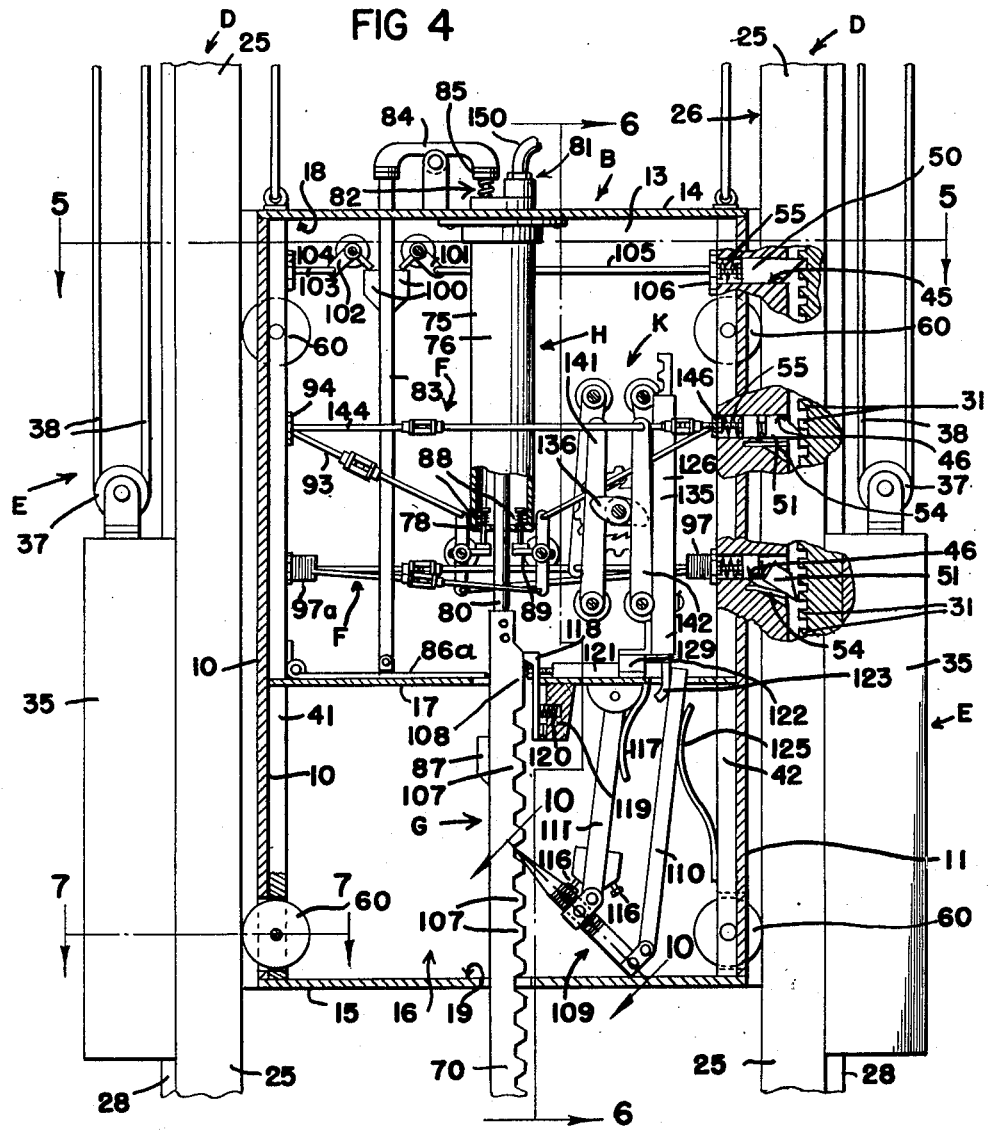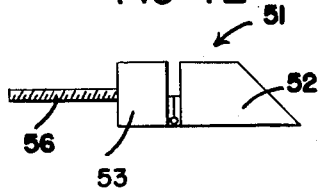

Oct. 14, 1952 H. M. SMURR 2,613,868
WAVE MOTOR ASSEMBLY
Filed March 7, 1949 5 Sheets-Sheet 4
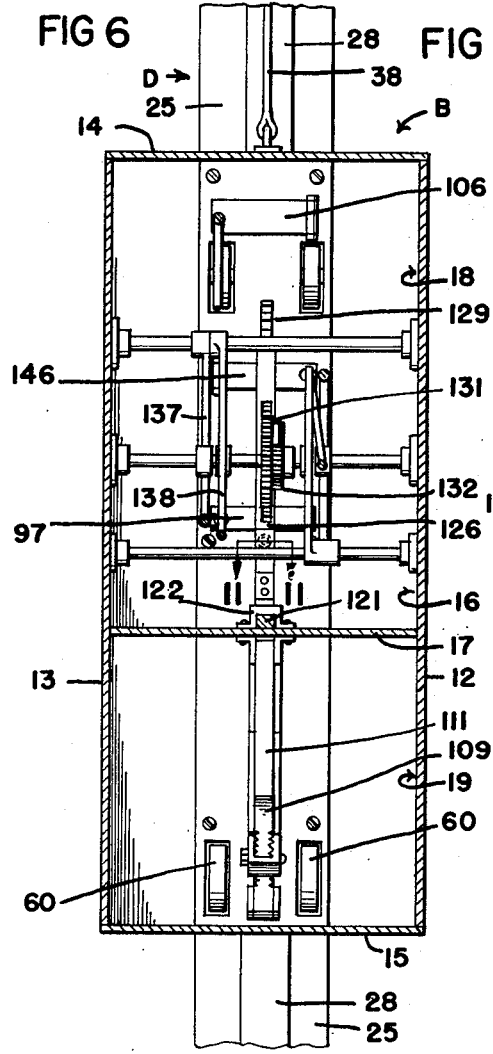
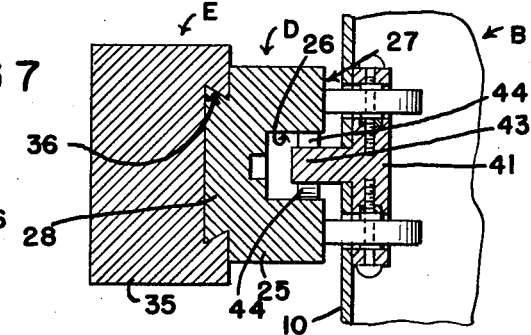
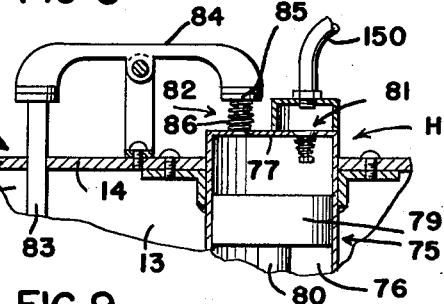
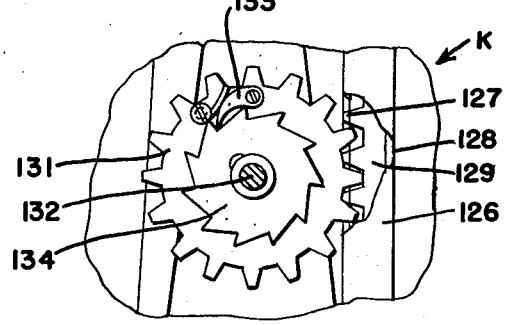
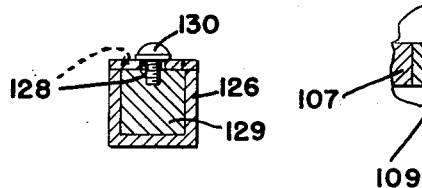
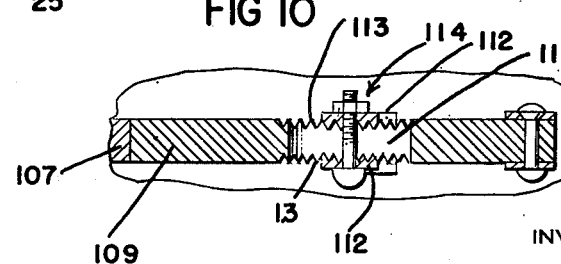
INVENTOR.
Harry M. Smurr
BY
ATTORNEYS.

Patented Oct. 14, 1952

2,613,868

UNITED STATES PATENT OFFICE 2,613,868

WAVE MOTOR ASSEMBLY

Harry M. Smurr, Hanford, Calif.

Application March 7, 1949, Serial No. 80,000

6 Claims. (Cl. 230—67)

This invention relates to motors operated by the movements of marine waves and swells.

An important object of the invention is to provide a motor assembly including a float, so constructed that both the forward thrust and the upward lift of the waves and swells upon the float will be utilized by the motor.

Another important object is to provide, as a part of a so-called wave motor, means for automatically compensating for the rising and falling of the tides, whereby the motor will operate during ebb and flow and at high and low tides.

A further object is to provide a wave motor assembly, including a float and reciprocable housing for the motor, so disposed that the float, in one position, may bodily move the housing in one direction to elevate the housing.

Furthermore, an important object is to provide a wave motor assembly in which the assembly is so positioned (slanted) that the assembly will utilize a substantial part of the available power of the waves and swells.

Other objects and advantages of the invention will be apparent during the course of the following detailed description of the invention, taken in connection with the accompanying drawings forming a part of this disclosure, and in which drawings:

Fig. 1 is a front or seaward elevation of the novel motor assembly disposed with its lower end in the water off shore.

Fig. 2 is a side elevation thereof with the direction of the shore indicated.

Fig. 3 is a view, mostly in top plan, of the same.

Fig. 4 is a vertical section, substantially on the line 4—4 of Fig. 3, certain latches shown thereon being shown in their operative positions, although normally all may be retracted.

Fig. 5 is a horizontal section substantially on the line 5—5 of Fig. 4 but with certain parts of a counterbalancing means moved so as to better illustrate other parts of the structure.

Fig. 6 is a vertical section substantially on the line 6—6 of Fig. 4.

Fig. 7 is a fragmentary horizontal section of a motor housing, support means and counterbalance means therefor, substantially on the line 7—7 of Fig. 4.

Fig. 8 is a fragmentary view mostly in vertical section of the upper portion of the motor and associated structure.

Fig. 9 is a view of a rack, pinion, pawl and ratchet forming a part of the operating means for sustaining the housing of the motor assembly.

Fig. 10 is a horizontal section through a rocker arm portion substantially on the line 10—10 of Fig. 4.

Fig. 11 is a vertical section through the rack of Fig. 9 and its housing, substantially on the line 11—11 of Fig. 6.

Fig. 12 is a plan view of a jointed latch forming part of the motor assembly.

Figure 13:
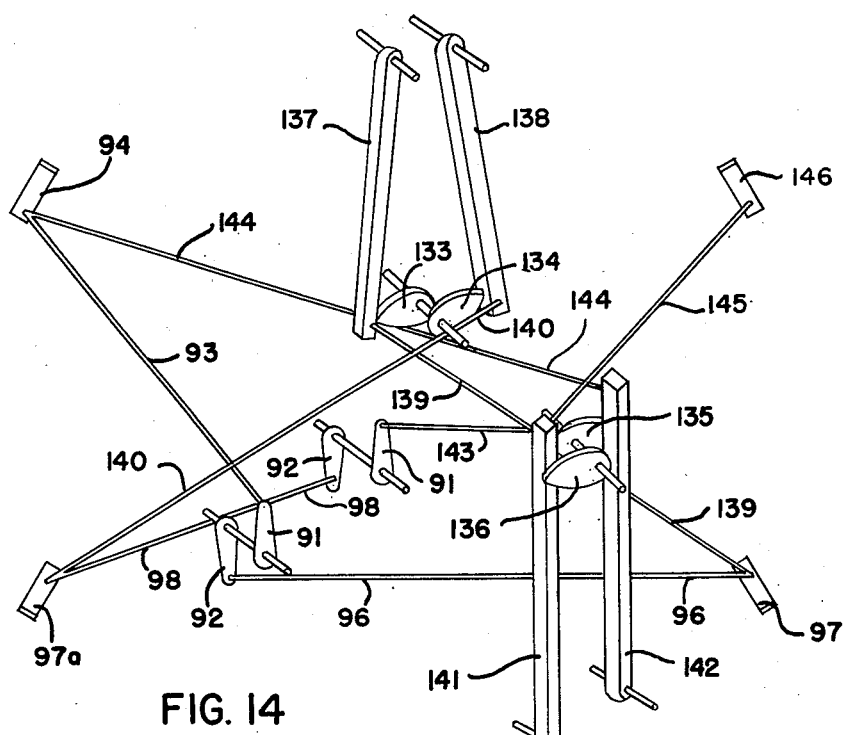
Fig. 13 is a partly diagrammatic showing of portions of the operating means for sustaining the motor housing.

In the drawings, wherein for the purpose of illustration is shown a preferred embodiment of the invention and wherein similar reference characters designate corresponding parts throughout the several views, the new motor assembly A includes a housing B; float C; support and guide means D for the housing B and guide means for the float C as well as for a counterbalancing means E for the housing B; means F to sustain the housing B; means G to transmit the reciprocatory motion of the float C to the actuating means H; means K for operating the means F; and means L to counterbalance the weights of the float C and the portions of the motor A attached to the float C.

The elevated and vertically reciprocable housing B encloses and supports much of the operating mechanism of the motor, and preferably comprises four upwardly extending walls 10, 11, 12 and 13, an upper wall or roof 14 and a lower wall or floor 15, all joined together to provide a chamber 16, which may be divided by a horizontally extending support or platform 17 so that there is an upper compartment 18 and lower compartment 19.

In the example shown, the float C, illustrated in Figs. 1 and 2, is shown as having a cylindrical wall 20 closed by end walls 21 and 22 and is substantially water tight.

Figure 15:
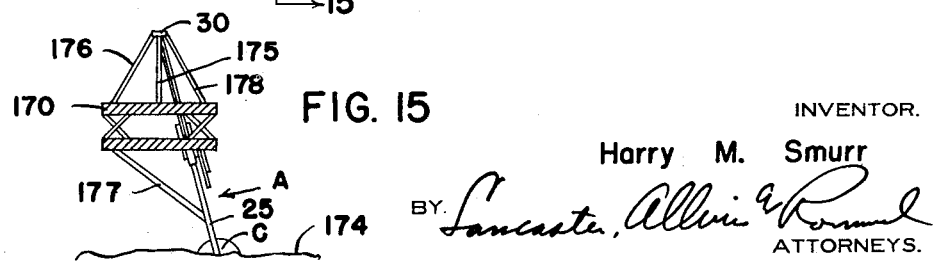
Fig. 15 is a vertical section of the same, substantially on the line 15—15 of Fig. 14.

The support and guide means D for the housing B and float C, as well as for counterbalancing means E for the housing, may include a pair of spaced apart standards 25 close to and facing the vertical medial lines of the walls 10, 11, 21 and 22 and suitably immovably secured off shore. As may be seen, in Figs. 2 and 15, the standards are preferably not vertical but slope somewhat, with their upper ends projecting shoreward. Each standard 25 is preferably provided with a longitudinally extending groove 26 in its housing and float facing side 27 and a preferably dovetailed, longitudinally extending tongue 28 extending from its opposite side 29. Joining the upper end portions of the two standards 25 is a cross member 30, the end portions of which extend beyond the vertical planes of the sides 29. Preferably at the base of each of the grooves 26 is a longitudinally extending row of teeth 31, shown in Fig. 4, cut into the side 27 of each standard 25 each tooth having a flat and outwardly extending lower face, a vertically extending face extending therefrom, and a substantially flat horizontal face projecting from the vertically extending face. These are provided as a part of the housing sustaining means F to be described.

The housing counterbalancing means E may comprise two suitable weights 35, each having a dovetailed groove 36 to receive the tongues 28, and being vertically slidable along the dovetailed tongues 28, and carrying a pulley 37 at its upper end. Under the pulley extends a suitable flexible member as a cable 38 with one end secured to the end portion of the cross member 30. The intermediate portion of the cable extends over two spaced apart pulleys 39 and 40 carried in recesses in the cross member 30 and then projects downwardly, with the other end portion secured to the housing B. I have found it desirable to secure this end of the cable 38 not directly to the upper wall 14 but to an insert 41 or 42, as the case may be, shown particularly in Figs. 4, 5 and 7, carried by the housing B within the compartment 16, preferably extending from the wall 14 downwardly and disposed against the inner face of the wall 10 or 11 as the case may be and suitably secured thereto. These inserts 41 and 42 each carry a longitudinally extending tongue 43 which projects through a longitudinally extending slot in each wall 10 or 11 as the case may be, at the medial line thereof (as in Figures 5 and 7). These tongues 43 are constructed and arranged to extend into the grooves 26 and may carry friction reducing means, as roller bearings 44, to roll over the adjacent surfaces of the walls of these grooves 26. The inserts 41 and 42 have a third function, since each contains a series of spaced apart transversely extending sockets 45 and 46, shown more particularly in Fig. 4, and accommodating portions of the means F to be next described. These sockets 45 extend through the tongues 43, and have substantially horizontal upper and lower faces, but the sockets 46 differ therefrom by having substantially horizontal lower faces from the inner faces of the inserts 41 and 42 to short of the outer ends of the tongues 43 whereupon the lower faces project downwardly to form obtuse angles.

Referring now to the means F to sustain the housing B. Shown, for example, in Fig. 4, there are provided two kinds of latch members. One latch member of a pair 50 is adapted to slide along a socket 45 and have a downwardly and inwardly extending outer face. The other latch members 51, are alike and as may be seen in Fig. 12, are each of two-part construction, comprising a forward portion 52 and a rearward portion 53 suitably hinged together at their lower portions, so that the forward portion 52 may tip downwardly. The forward end of the portion 52 has a downwardly and outwardly projecting outer face. It is now obvious that these latch members 51, upon upward movement of the housing B, may collapse so as to pass over the teeth 31 but, upon downward movement of the housing B, they cannot collapse since their hinged ends will prevent upward tipping movements of the forward portions 52. Consequently the housing cannot descend until the latch member 51 is retracted. To assure that the forward portions 52 will positively engage the teeth 31, I provide a leaf spring 54 for each portion 52, secured to the lowermost face of the wall of each socket 46 at the downwardly and outwardly portion thereof, normally urging the portions 52 upwardly so as to be caught by the teeth 31 as the housing B is lowered. Rearwardly of each latch member 50 and 51 is a conventional expansion spiral spring disposed in each socket 45 and 46 and bearing against a latch member 50 or 51 and normally urging it outwardly. The other ends of these springs bear against the end walls of the sockets. To each latch member 50 and 51 is secured a rigid portion, as a bolt shank 56, surrounded for a portion of its length by the spring just mentioned. The rearward end portion of each bolt shank slidably extends through suitable openings in the inserts 41 and 42 and projects therefrom where they are secured to levers 94, 97, 97ª and 146, to be later described in connection with the means K to actuate the means F.

Antifriction means for the housing B, during its reciprocation, (in addition to the antifriction means represented by the roller bearings 44) may be other roller bearings 60 carried by the housing walls 10 and 11, projecting outwardly of their outer faces and bearing against the sides 27 of the standards 25.

The float C is guided in its vertical reciprocation by the walls of the grooves 26, in conjunction with vertically-extending tongues 65 carried by the end walls 21 and 22 of the float C as well as by a yoke member 66 extending upwardly from the uppermost portion of the cylindrical wall 20. These tongues and the yoke member 66 may carry antifriction means, as roller bearings (like the roller bearings 44) projecting from the tongues 65 to engage the walls of the grooves 26, and roller bearings 68 projecting from the yoke portion 66 and engaging the sides 27 of the standards 25.

Means G to transmit the vertical reciprocating motion of the float C to the actuating means H of the motor A may be a rod 70 having a bifurcated lower end pivotally secured to the intermediate section of the yoke portion 66. This rod extends upwardly through a suitable opening in the bottom wall or floor 15 into and through the chamber 19, thence through a suitable opening in the platform 17 and into the chamber 18 where it is connected to the lower end portion of a piston rod 80 forming a part of the means H.

The means H includes a cylinder 75 having a cylindrical wall 76 (the upper end portion of which preferably projects exteriorly of the top wall 14 of the housing B) and, as shown in Fig. 2, 4 or 8, upper end wall or head 77 and lower end wall 78 defining a piston chamber in which reciprocates a piston 79 with a piston rod 80 extending through the wall 78 and joined to the rod 70. As may be seen in Fig. 8, in wall 77 is an outlet valve 81 and an air intake and release valve 82, both disposed exteriorly of the housing B and with the valve 82 mechanically actuated by a push rod 83 extending through the wall 14 and engaging the under face of one end portion of a rocker arm 84 mounted upon the wall 14 with the other arm of the latter engaging the upper end of the valve stem 85 of the valve 82 (this stem being normally urged upwardly by spring means 86). The lower end of the push rod 83, as may be seen in Fig. 4, rests upon the intermediate portion of a normally horizontal lever 86ª which is fulcrumed adjacent the housing wall 10 and extends to the opening in the partition 17 through which the push rod reciprocates. This opening is large enough to accommodate an abutment 87 carried by the rod 70, so that upward movement of the latter will cause the abutment 87 to move through this opening, press against the lever 86ᵃ and swing the lever 86ᵃ on its fulcrum, thus causing the push rod 83 to move upwardly, actuating the rocker arm as described. This push rod 83 also carries an abutment 100 forming part of the means K to be subsequently described.

The lower end wall 78 of the cylinder 75 carries two relatively short, headed push rods 88 which project into the cylinder's chamber and are normally urged upwardly thereinto by expansion spiral springs, so that the heads of the push rods will be contacted by the piston 79 at the lowermost limit of its movement, and depress the rods 88. They extend exteriorly of the cylinder 75 and contact (rest upon) the substantially horizontal portion of each of two rocker arms 89, forming parts of the means K, operatively connected with the means F to sustain the housing B.

The means K for operating the means F includes a rock shaft 90, shown in Fig. 5, for each rocker arm 89, with the latter adjustably mounted thereon as by a set screw. The rock shafts 90 may be pivotally carried by the housing B, as by its walls 12 and 13, and each rock shaft carrier a pair of adjustable arms 91 and 92 (slidable along the shafts but releasably held thereon, as by set screws and diagrammatically shown in Fig. 13). The arms 91 normally extend upwardly and the free end of one is connected with one end of a link 93 with the other end of the latter attached to one end of a lever 94 whose other end is fulcrumed on the insert 41 and its intermediate portion attached to the protruding end of the bolt shank or rigid portion 56 of the uppermost of the lower latches 51. The other arm 91 is operatively connected with an arm 141 to be subsequently described. As for the arms 92, they normally extend downwardly and at one end of one is secured one end of a link 96 with the other end of the link 96 secured to one end portion of a lever 97 fulcrumed on the insert 42 and operatively connected with the bolt shank or rigid portion 56 of the lowermost of the lower latches 51. The other arm 92 is connected to a lever 97ᵃ by link 98; this lever 97ᵃ being fulcrumed on the insert 41 below lever 94.

Referring back to the push rod 83, as shown in Fig. 4, below its upper end are a pair of abutments 100 having two upper rocker arm contacting faces to contact rocker arms 101 and 102 which are pivotally carried by shafts which may be pivotally carried by the housing walls 12 and 13. One arm of each rocker arm 101 and 102 rests upon the upper face of an abutment 100 and the other arm of the rocker arm 102 is pivotally connected with one end of a link 103 with the other end of the link pivotally carried by the free end of a lever 104 fulcrumed on the insert 41 and attached to the bolt shank of one upper latch 50. The other arm of the rocker arm 101 is pivotally connected with one end of a link 105 with the other end of the link 105 pivotally carried by the free end of a lever 106 fulcrumed on the insert 42 and attached to the bolt shank 56 of the other upper latch 50.

Again referring to the rod 70 which extends upwardly from the float C, it will be noted that it is provided with a plurality of spaced-apart short abutments 107, having outwardly converging side faces, with these abutments extending along a portion of the length of the rod 70, with a projection or longer abutment 108 above the abutments 107. Engaging one after another of the abutments 107 is the free end of an elongated rocker arm portion 109 which projects upwardly from its pivotal connection with a second rocker arm portion 110 which extend upwardly through an opening in the partition 17 and its function will be subsequently described. It will be noted in Fig. 4 that the abutment 108 has beveled ends merging into the face of the rod 70 with the distance between the lowermost bevel and that of the next adjacent abutment 107 being substantially that of the distance between two adjacent abutments 107. The rocker arm portion 109 is pivotally suspended, intermediate its length, from an oscillating bracket or arm 111. The position of the pivotal connection may be varied. For this purpose, as shown in Fig. 10, I prefer to provide a pair of plates 112 carried by an ear integral therewith and with each of the ears carrying a pivot pin extending through the lower end portion of the bracket 111. These plates 112 are preferably corrugated so that the corrugations may cooperate with corrugations 113 carried by the rocker arm portion 109 and by a bolt and nut assembly 114 with the bolt shank extending through a slot 115 in the arm portion 109 so as to adjustably position the arm portion 109 with respect to the bracket 111. The latter is pivoted at its upper end to ears carried by the partition 17.

Means to limit rocking of the arm portion 109 may be set screws 116 with their shanks converging upwardly and their heads adapted to abut the arm portion 109 after it has rocked through a set number of degrees of arc.

Means to cushion oscillations of the bracket or arm 111 may comprise a leaf spring 117 which also functions to press the arm 111 to the left in Fig. 4 and, consequently, the free end of the rocker arm portion 109 within the spaces between the abutments 109 and in contact with a selected abutment.

Engaging the longer abutment 108 is the free end of a lever 118 with the lever extending through the partition 17 and its end, below the partition, being fulcrumed to a bracket 119 depending from the partition 17. An expansion spiral spring 120 carried in a socket in the bracket 119 bears against the intermediate portion of the lever 118 to urge it against the abutment 108.

A horizontally reciprocable push rod 121 is coupled at one end to the free end portion of the lever 118 and slides through an opening in a guide block 122, mounted, as shown in Figure 4, upon the support 17. The other end of this rod 121 is provided with a depending arm 123 extending through a slot in the partition 17 and this limits movement of the push rod 121 to the left, as in Fig. 4. The upper end section of the second rocker arm portion 110 abuts this last mentioned end of the push rod 121 and is urged thereagainst by a leaf spring 125 bearing against the intermediate section of the rocker arm portion 110, this spring being carried by the insert 42.

The guide block 122 supports an upwardly-extending rack housing 126, provided with a longitudinally-extending, pinion-accommodating slot 127 facing the cylinder 75 and a guide slot 128 at the opposite side of the housing. Within the housing is a rack 129, slidable longitudinally thereof with a headed pin 130, shown in Fig. 11, attached thereto and slidable along the guide slot 128. The length of the slot 128 and position of the pin 130 is such that the rack cannot descend to a position below the plane of the upper face of the push rod 121. In Fig. 4 the lower end of the rack rests upon the push rod 121 to the right of the guide block 122 but when the push rod 121 slides to the left in Fig. 4, the upper end of the rocker arm portion 110 will follow and replace the push rod 121 in its function of supporting the rack 129. Of course as the rocker arm portion 110 ascends it will move the rack 129 upwardly.

The slot 128 is enlarged in width at its lower portion, to substantially the width of the housing 126 in order to allow space for proper movement of the portion 110, in event the push rod 121 is pulled back only part way.

The reason the push rod 121 may move to the left is because, as the lever 118 leaves the abutment 108 (as the rod 70 descends), its upper end swings to the left and, since the push rod 121 is secured to it, it also moves to the left.

Meshing with the teeth of the rack 129 is a pinion 131 best shown in Fig. 9, pivotally supported, and freely rotatable on a shaft 132 carried by the walls 112 and 113. The pinion 131 carries a spring-urged pawl 133 engaging a ratchet wheel 134. This latter is mounted upon the shaft 132 for rotation therewith.

The shaft 132 carries a plurality of cams. In the example shown there are cams 133, 134, 135 and 136 (shown in Fig. 13) and they are preferably adjustable longitudinally of the shaft 132, with the cams 133 and 134 to one side of the pinion 131 and the cams 135 and 136 to the other side thereof. Each cam has an arcuate surface and a bill opposite the arcuate surface spaced, from the axis of rotation of the cam, a distance considerably more than is the arcuate surface. The cams 133 and 136 have their bills pointing in one direction while the bills of the cams 134 and 135 point in the opposite direction. The cam 133 is positioned to contact the surface of an arm 137, and the cam 134 is positioned to contact the surface of an arm 138, both arms depending from separate shafts for oscillation thereon.

Referring mainly to Fig. 13, the arm 137 is connected to the lever 97, adjacent the connection of the link 96 therewith, by the link 139 while the arm 138 is connected to the lever 97ᵃ by the link 140.

The cam 135 is positioned to contact the surface of an arm 141 and the cam 136 is disposed so as to contact the surface of an arm 142. The arms 141 and 142 have pivotal connections at their lower end portions on suitable shafts and project upwardly. Their free end portions are connected as follows: By a link 143, arm 141 is connected with the other arm 91 of the rocker arm heretofore mentioned, and by a link 144, the arm 142 is connected with the lever 94. The arm 141 is connected by a link 145 to the upper lever 146 fulcrumed on the insert 42 and connected with the bolt shank 56 of the uppermost of the lower latches 51.

The four shafts supporting the arms 137, 138, 141 and 142, may be supported in whole or in part by the walls 12 and 13 of the housing B.

From the upper end of the housing of the valve 81, as in Figs. 4 and 8, a conduit 150 may open thereinto and extend to a reservoir (not shown) for storage of air under pressure, pumped by the motor A.

Referring particularly to Figs. 1, 2, 3 and 5, there is shown means L to counterbalance the weights of the float C and the portions of the motor A attached thereto, such as the rod 70, piston rod 80 and piston 79. To the yoke portion 66, adjacent the ends thereof, may be secured a forked flexible member 155 which extends upwardly to a pulley 156 carried by a gooseneck bracket 157 extending outwardly from the upper portion of the wall 12 of the housing B, from which pulley the flexible member 155 extends downwardly and beneath a pulley 158 carried by a counterweight 159. From the pulley 158 the flexible member extends upwardly and over a third pulley 160 whereupon it extends downwardly and is secured to the counterweight 159. For guiding the reciprocations of the counterweight 159 there may be provided a pair of spaced-apart, upwardly extending angle irons 161, secured to the wall 12 of the housing B, with one leg of each angle iron extending into one of a pair of grooves 162 extending from the rear face of the counterweight 159. A third guideway may be provided comprising a T-iron 163 disposed intermediate the two angle irons 161 and similarly secured. One leg of this, having a pair of longitudinally-extending flanges, fits into a T-shaped groove 164. Since the standards 25 are inclined as stated, and as shown in Fig. 2, this arrangement provides efficient guide means. The two angle irons 161 and T-iron 163 extend downwardly below the plane of the bottom wall or floor of the housing B.

In the operation of the motor A, with the upward surge of the waves or swells, the float C is elevated, thus raising the rod 70, piston rod 80 and piston 79 and compressing air in the cylinder 75 which air is forced through the valve 81 and along the conduit 150 to a suitable reservoir (not shown).

During this interval, the counterweight 159 is lowered, as is obvious, and this aids in taking advantage of the full upward surge of the waves or swells. Because of the specific arrangement of pulleys 156, 158 and 160, the counterweight descends (or ascends) a less distance than the float C ascends (or descends).

As the arm 70 reciprocates, the free end of the rocker arm portion 109 progressively engages an abutment 107, causing the second rocker arm portion 110 to reciprocate. When the free end of the rocker arm portion 109 is drawn downwardly, the rocking of this portion causes the rocker arm portion 110 to move upwardly. If the push rod 121 may move to the left in Fig. 4, the upper end of the rocker arm portion 110 contacts the bottom end of the rack 129 and causes it to ascend. This causes rotation of the pinion 131 counterclockwise and consequent rotation of the ratchet wheel 134 and shaft upon which it and the cams 133 to 136 are mounted. These cams, as stated, actuate the arms 137, 138, 141 and 142.

As the arms 137 and 138 swing apart during every half rotation of the cams 133 and 134, they pull (by way of the associated links) the levers 97 and 97ᵃ. As these levers move, they withdraw the two lowermost latches 51 and permit the housing B to descend one step (one notch distance). Since the latches 51 are jointed as stated, as they are withdrawn, the portions 52 drop upon the leaf springs 54 and, as the portions 52 clear the outermost edge of the teeth 31, the leaf springs 54 urge the portions 52 upwardly, so as to engage between two teeth when the latches 51 move toward the teeth. The upper latches 51 operate similarly to the lower latches 51, one being operatively connected with a rocker arm 91 and arm 142 and the other connected with an arm 141.

When the housing B has been lowered to its proper distance from the float for operation of the motor, the descent of the housing will cease for the time, since the abutment 108 on the rod 70 will urge the push rod 121 to the right (as in Fig. 4) and the latter will, in turn, push the upper end of the rocker arm portion 110 to the right and into its position as in Fig. 4, so that the upper end of the latter will no longer sustain the rack 129. However the descent of the rack 129 is prevented so long as the abutment 108 engages the push rod 121 since the right hand end of the latter is now blocking the lower mouth of the passageway through the rack housing 126. Functioning of the rocker arm portion 110 is prevented so long as the abutment 108 contacts the push rod 121, and this takes place when the piston 79 is but a short distance from the head or end 77 of the cylinder 75.

So long as this relative position of parts is in effect, the housing B will remain stationary.

In the event the tide ebbs faster than the housing B can descend step-by-step, the float C will descend and draw the piston 79 to a position where its lower face will contact the upper ends of the push rods 88 in the base of the cylinder 75, and these push rods will move downwardly and rock all of the rocker arms 91 and 92, which will simultaneously cause retraction of all four latches 51 so that the housing B may descend faster than step-by-step. It should be noted, of course, that during the step-by-step movement of the housing B as well as during the faster descent just mentioned, the latches 50 are retracted.

When the tide comes in, the float C will rise higher and higher during each upward stroke of the piston rod. Just as the piston 79 is about to contact the top wall 77, the abutment 87 on the rod 70 engages the lever 86ª which causes the push rod 83 to rock the rocker arm 84 so that the latter will open the valve 82, releasing the air in the cylinder between the piston and wall 77 at substantially the same time that the two abutments 100 on the same push rod 83 cause rocking of the arms 101 operatively connected with the latches 50 to retract them. Just as this occurs the float C contacts the bottom of the housing B and, since the counterbalancing means E compensates for the weight of the housing B, the float C may readily push the housing B to a higher level. Thus the float not only provides for operation of the motor but also performs this added function.

Of course, as the housing B descends, the latches 50 will be automatically pushed in and pass over the teeth 31 but these latches will prevent the housing from ascending when air is being compressed in the cylinder 75, and are mechanically retracted when the housing B is to be raised to a higher level as a result of rise in the tide. As has been described, the latches 51 regulate the descent of the housing B.

Figure 14:
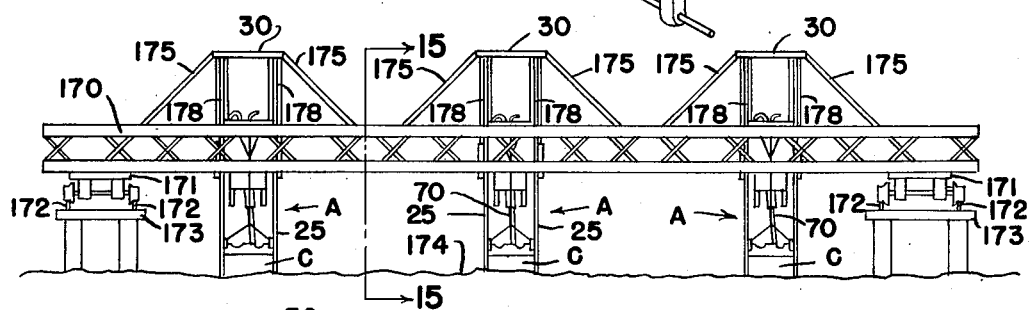
Fig. 14 is an elevation of a battery of the new wave motor assemblies in use.

In order to utilize the new wave motor assemblies in a desirable stretch of water off shore, a plurality of the assemblies A may be utilized as shown in Fig. 14 as a battery, for example. Here three assemblies A are supported by a truss 170 which may be carried, as at its end portions, by suitable trucks 171 with the wheels thereof rolling upon rails 172 fixed to piers 173 extending from the shore, out above the water surface 174. The assemblies A may be disposed in spaced-apart relationship and inclined, as in Fig. 15, being braced by suitable braces as the braces 175 to 178 inclusive with the floats C buoyed up with portions thereof above the water surface 174. The float assemblies A will then operate in unison and multiply the power created by any one assembly. Moreover, the mounting of the assemblies on trucks permits them to be moved out over the water to a desired location or beached for repairs, etc.

Various changes may be made to the form of the invention herein shown and described without departing from the spirit of the invention or scope of the claims.

I claim:

1. In a wave motor assembly, a reciprocable housing, a compressor carried thereby, a float, connection means between the compressor and float, including a reciprocable rod extending upwardly from said float to said compressor and provided with a row of spaced-apart abutments, support means for said housing, including a standard, means to engage said abutments, one after another, upon reciprocation of said rod, comprising a rocker arm portion carried by said housing, latch means to releasably retain said housing in step-by-step positions with respect to said standard, including latches carried by said housing, and means, operatively connected between said rocker arm portion and latch means, to actuate said latch means, including a reciprocable second rocker arm portion pivotally connected with said first rocker arm portion, a rack and pinion carried by said housing and operated by said second rocker arm portion, cams carried by said housing and operated by said rack and pinion, oscillating arms operated by said cams, and link and lever means operatively connecting said oscillating arms and said latch means.

2. In a wave motor assembly, a reciprocable housing, a compressor carried thereby, a float, guide means for said housing, including an upwardly-extending standard, connection means between the compressor and float, including a reciprocable rod extending upwardly from said float to said compressor and provided with a row of spaced-apart abutments, means to engage said abutments, one after another, upon reciprocation of said rod, comprising a rocker arm portion carried by said housing and having an abutment-engaging free end, latch means to releasably retain said housing in step-by-step positions with respect to said standard, including latches carried by said housing, and keeper teeth carried by said standard, and means, operatively connected between said rocker arm portion and latch means, to actuate said latch means, including a reciprocable second rocker arm portion pivotally connected with said first rocker arm portion, a rack and pinion carried by said housing operated by said second rocker arm portion, cams carried by said housing and operated by said rack and pinion, oscillating arms carried by said housing and operated by said cams, and link and lever means connecting said oscillating arms and said latch means.

3. In a wave motor assembly, a support, a housing slidably carried thereby, a fluid pressure creating device carried by the housing, including a cylinder, a piston therein and a piston rod, a float, valve means carried by said cylinder to release fluid pressure within said cylinder including a vertically reciprocable valve stem, means operatively connected between said piston rod and float to reciprocate said piston rod upon reciprocation of said float, including a reciprocating rod, and means to open said valve by depressing said valve stem thereof, including an abutment on said reciprocating rod, a lever pivoted to said housing, with its free end disposed within the path of travel of said abutment, a vertically reciprocable push rod carried by said housing with its lower end operatively connected with said lever, and a rocker arm carried by said housing with one arm thereof contacting the upper end of said push rod and its other arm contacting the upper end of said valve stem.

4. In a wave motor assembly, a support, a housing slidably carried thereby, a fluid pressure creating device carried by the housing, including a cylinder, a piston therein and a piston rod, a float, valve means carried by said cylinder to release fluid pressure within said cylinder including a vertically reciprocable valve stem, means operatively connected between said piston rod and float to reciprocate said piston rod upon reciprocation of said float, including a reciprocating rod, means to open said valve by depressing said valve stem thereof, including an abutment on said reciprocating rod, a lever pivoted to said housing, with its free end disposed within the path of travel of said abutment, a vertically reciprocable push rod carried by said housing with its lower end operatively connected with said lever, a rocker arm carried by said housing with one arm thereof contacting the upper end of said push rod and its other arm contacting the upper end of said valve stem, means to latch said housing against movement carried by the housing and support, and means to disengage said latch means, including a second abutment on said push rod, a rocker arm carried by said housing and disposed within the path of travel of said second abutment, and an operative connection between said rocker arm and said latch means, said last-named means being operable substantially simultaneously with the opening of said valve.

5. In a wave motor assembly, a support, a housing slidably carried thereby, a fluid pressure creating device carried by the housing, including a cylinder, a piston therein and a piston rod, a float, valve means carried by said cylinder to release fluid pressure within said cylinder including a vertically reciprocable valve stem, means operatively connected between said piston rod and float to reciprocate said piston rod upon reciprocation of said float, including a reciprocating rod, means to open said valve by depressing said valve stem thereof, including an abutment on said reciprocating rod, a lever pivoted to said housing, with its free end disposed within the path of travel of said abutment, a vertically reciprocable push rod carried by said housing with its lower end operatively connected with said lever, a rocker arm carried by said housing with one arm thereof contacting the upper end of said push rod and its other arm contacting the upper end of said valve stem, means to latch said housing against movement carried by the housing and support, means to disengage said latch means, including a second abutment on said push rod, a rocker arm carried by said housing and disposed within the path of travel of said second abutment, and an operative connection between said rocker arm and said latch means, said last-named means being operable substantially simultaneously with the opening of said valve, step-by-step latch means for permitting step-by-step lowering of said housing, with respect to said support, including a pair of latches carried by said housing, and means to throw said step-by-step latch means out of operation, including a pair of push rods disposed in the downward path of travel of said piston, rocker arms carried by said housing and disposed in the path of travel of said push rods and an operative connection between said pair of latches and said rocker arms.

6. In a wave motor assembly according to claim 1 in which there is provided a horizontally reciprocable push rod carried by said housing and having a depending arm, a lever with its free end coupled to said push rod, said lever having a portion slidably accommodated in the spaces between said abutments, spring means urging said portion into said spaces, a vertical rack housing for said rack having an open lower end accommodating the free end of said second rocker arm portion, means carried by said rack housing and rack to limit descent of said rack in said rack housing to a position with the lower end of said rack normally resting upon said push rod, said depending arm being disposed in the path of travel of said second rocker arm when said rack rests upon said push rod, and means resiliently urging said second rocker arm against said depending arm.

HARRY M. SMURR.

REFERENCES CITED

The following references are of record in the file of this patent:

UNITED STATES PATENTS

| Number | Name | Date |
|---|---|---|
| 870,706 | Woodard | Nov. 12, 1907 |
| 1,105,249 | Bustos | July 28, 1914 |
| 1,213,104 | Hulden | Jan. 16, 1917 |
| 1,256,106 | Callaway | Feb. 12, 1918 |
| 1,647,025 | Stich | Oct. 25, 1927 |
| 1,757,166 | Brady | May 6, 1930 |
| 2,242,598 | Quinte | May 20, 1941 |